Dec. 4, 1956 H. S. ROSS 2,772,576
TWO SPEED TRANSMISSION GEAR MECHANISM
Filed Jan. 17, 1955 2 Sheets-Sheet 1
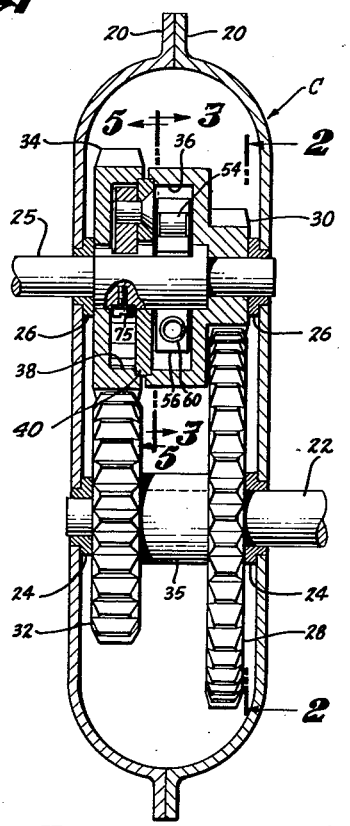
HOWARD S. ROSS,
INVENTOR.
BY
ATTORNEY.

Dec. 4, 1956 H. S. ROSS 2,772,576
TWO SPEED TRANSMISSION GEAR MECHANISM
Filed Jan. 17, 1955 2 Sheets-Sheet 2
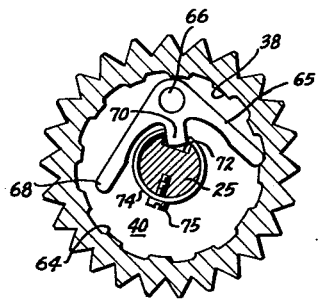
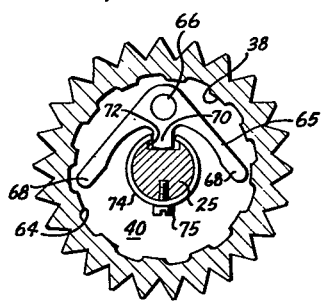
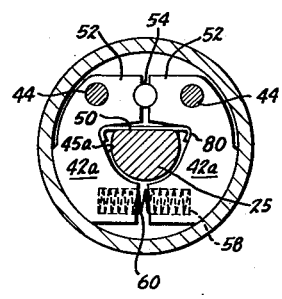
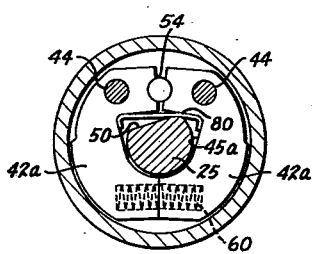
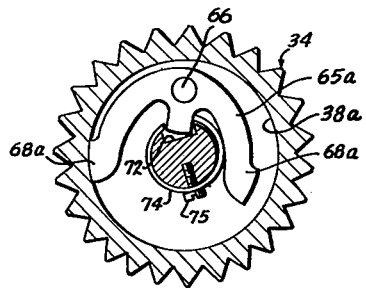
HOWARD S. ROSS,
INVENTOR.
BY
ATTORNEY.

United States Patent Office 2,772,576
Patented Dec. 4, 1956

2,772,576

TWO SPEED TRANSMISSION GEAR MECHANISM

Howard S. Ross, Twin Falls, Idaho

Application January 17, 1955, Serial No. 482,057

13 Claims. (Cl. 74—337)

This invention relates to transmission gearing and is directed to a two-speed transmission gear mechanism that has utility, for example, in a fishing reel as well as in other apparatus.

The invention is directed to the problem of providing a transmission mechanism that will automatically shift from high gear to low gear and vice versa in response to changes in load. In a fishing reel, such a transmission mechanism will spool in a fishing line at relatively high speed so long as the tension of the fishing line is relatively low and will shift to low gear if the tension rises to a predetermined critical magnitude. Once in low gear, the transmission will return to high gear whenever the tension on the line drops below the predetermined magnitude.

The invention achieves its purpose by two sets of gears interposed between a rotary input means and a rotary output means, in combination with two corresponding clutches that make the two sets of gears effective in accord with the magnitude of the load imposed on the output means. One of the sets of gears is a high-speed set connected to the output means by a first clutch that is normally engaged but releases in response to the rise in torque load to the predetermined magnitude. The other set of gears is a low-speed set connected to the output means by a second overrunning clutch that permits the output means to race ahead when the high speed gearing is effective, this overrunning clutch automatically taking over the load when the high-speed clutch releases in response to a torque rise.

The high-speed clutch has a lost motion connection with the output means that permits a limited range of rotary movement of the high-speed clutch relative to the output means and the high-speed clutch engages and releases in response to this relative movement. Spring means is interposed to resist this relative movement in the clutch-releasing direction and it is the resistance of this spring that determines the magnitude of torque that is effective to release the high-speed clutch.

A feature of the invention is the provision of two such clutches, a high-speed clutch and a low-speed overriding clutch, that will cooperate in either direction of rotation of the gear system, the overriding clutch being reversible in response to reversals of direction of rotation of the system. For this purpose the high-speed clutch engages or becomes effective at an intermediate point in its range of movement relative to the output means and releases at each extreme of this range, the torque-responsive spring resisting relative movement in both directions from the intermediate point. The low-speed overriding clutch is responsive to the same range of relative movement, reversing whenever the range of relative movement is traversed from one limit of the range to the other.

This feature of reversibility in the action of the two clutches for operation of the gear system in either rotary direction is a special advantage in a fishing reel because the same reel mechanism can be used by either a right-handed person or a left-handed person. Another feature pertinent to the use of the invention in a fishing reel is that the transmission mechanism may be arranged to let the fishing line unwind freely when it is pulled by a fish or, if desired, may be arranged to provide a drag effect on the line at such time.

The various features and advantages of the invention will be apparent from the following detailed description, considered with the accompanying drawings.

In the drawings, which are to be regarded as merely illustrative:

Figure 1 is a view of the gear mechanism partly in side elevation and partly in cross-section;

Figure 2 is a cross-section taken as indicated by the line 2—2 of Figure 1;

Figure 3 is a transverse section taken as indicated by the line 3—3 of Figure 1 showing the high-speed clutch in its effective position;

Figure 4 is a similar view showing the high-speed clutch in its release position;

Figure 5 is a transverse section taken as indicated by the lines 5—5 of Figure 1 showing the reversible low-speed clutch in one of its two limit positions;

Figure 6 is a similar view showing the low-speed clutch in its reversed or opposite limit position;

Figure 7 is a similar view showing the low-speed clutch in its intermediate neutral position;

Figure 8 is a view similar to Figure 3 showing a modification of the high-speed clutch with the clutch in its engaged or effective position;

Figure 9 is a similar view showing the high-speed clutch in one of its two limit release positions; and Figure 10 is a sectional view similar to Figure 5 showing a modified form of the low-speed clutch.

The embodiment of the invention selected for the present disclosure may be incorporated in a fishing reel and for this purpose the essential components of the invention may be housed in a gear case, generally designated C, which may be made in two separate sections having mating flanges 20. The mating flanges are suitably interconnected, for example by suitable screws (not shown). The rotary input means of this embodiment is in the form of a drive shaft 22 mounted in the case C by suitable bearings 24, this drive shaft being actuated by the usual fishing reel crank (not shown). The rotary output means is in the form of a driven shaft 25 journaled in suitable bearings 26, this driven shaft being operatively connected to the usual reel or spool (not shown).

The high-speed gearing that is operatively connected to the drive shaft 22 comprises a relatively large gear 28 and a relatively small gear 30 in mesh therewith. The low-speed gearing that is also operatively connected with the drive shaft 22 comprises a gear 32 and a second gear 34 of comparable size meshed therewith. In the construction shown, the two gears 28 and 32 are mounted on the drive shaft 22, being keyed thereto and separated by an intermediate sleeve 35. The gears 28 and 32 may be aptly referred to as the high-speed drive gear and the low-speed drive gear respectively. The high-speed drive gear 28 may be approximately four times the diameter of the high-speed driven gear 30, so that, with the low-speed drive gear 32 of substantially the same diameter as the low-speed driven gear 34, the high-speed driven gear 30 will rotate four times as fast as the low-speed driven gear 34.

The high-speed clutch for operatively connecting the high-speed gearing with the driven shaft 25 may include a clutch member in the form of a cylindrical wall 36 integral with the high-speed driven gear 30 and in like manner the low-speed clutch for operatively connecting the low-speed driven gear 34 with the driven shaft 25 may include a cylindrical wall 38 integral with the low-speed driven gear 34. The two cylindrical walls 36 and 38, which may be regarded as clutch casings, have adjacent open ends and cooperate to enclose an annular space around the driven shaft 25. Mounted in this annular space at an intermediate location therein is what may be termed a support member 40 in the form of a disc rotatively mounted on the driven shaft 25.

The first or high-speed clutch comprises a pair of friction shoes 42 pivotally mounted on one side of the disc 40 by corresponding pivot pins 44. The two friction shoes 42 are U-shaped in general configuration and are positioned with their ends adjacent each other to define a non-circular opening 45, each friction shoe having a shoulder 46 defining a portion of the non-circular opening. A portion of the driven shaft 25 that extends through the non-circular openings 45 is of non-circular cross-section, being in this instance formed with a peripheral flat face 50 for cooperation with the two friction shoe shoulders 46.

The two friction shoes 42 are interconnected at what may be termed their inner ends 52 by a small roller 54 which seats in a pair of curved recesses or seats 55 formed in the two inner ends respectively. Thus the small roller 54 serves as means to operatively interconnect the two brake shoes in such manner as to cause the shoes to operate synchronously.

What may be termed the outer ends 56 of the two friction shoes 42 have bores 58 therein to house a suitable coiled spring 60 that continuously urges the two outer ends apart to spread the brake shoes outward against the surrounding cylindrical clutch wall 36. Preferably the two brake shoes are formed with arcuate friction surfaces 62 near their outer ends which are the sole surfaces to make contact with the clutch wall 36.

It is apparent that the coiled spring 60 will tend to cause the two clutch shoes 42 to press outward into frictional engagement with the surrounding clutch wall 36 as shown in Figure 3. The driven shaft 25 may be rotated relative to the pair of clutch shoes, however, to cause the flat face 50 of the shaft to rock in either direction against either of the clutch shoe shoulders 46 with sufficient force to overcome the resistance of the coiled spring 60 and thus cause the two clutch shoes to contract by rotation to the retracted position shown in Figure 4. Thus the resistance afforded by the coiled spring 60 determines the torque loads to which the first or high-speed clutch responds by release action.

The cylindrical wall 38 of the second or low speed clutch may be recessed at circumferentially spaced points as shown in Figures 5 and 6 to form spaced clutch teeth 64 for releasable engagement by a clutch pawl 65. The clutch pawl 65 which is pivotally mounted on the second face of the disc 40 by a pivot pin 66, has two pawl arms 68 for engagement with the clutch teeth 64 alternately and is formed with an intermediate operating finger 70. The operating finger 70 extends into a short longitudinal groove 72 in the driven shaft 25 and preferably this groove has overhanging walls to form a restricted entrance to the groove. For this purpose, a split ring member 74 may be mounted on the driven shaft 25 by a suitable screw 75, with the ends of the split ring member overhanging the groove 72 from opposite sides as shown.

It is apparent that the position of the clutch pawl 65 relative to the surrounding clutch wall 38 depends on the rotary position of the disc 40 relative to the driven shaft 25. Thus when the disc 40 with the two friction clutch shoes 42 thereon is rocked relative to the shaft 25 to one of its limit positions shown in Figure 4, the clutch pawl 65 is rocked by its operating finger 70 to place one of the pawl arms 68 in engagement with the clutch teeth 64 as shown in Figure 5; and when the disc is rotated relative to the driven shaft to its opposite limit position the other pawl arm is swung into engagement with the clutch teeth as shown in Figure 6.

It is apparent that there is an intermediate neutral position or range of positions of the disc 40 relative to the driven shaft 25 at which, as shown in Figure 7, neither of the two pawl arms 68 is in engagement with the toothed clutch wall 38. If, however, the rotation of the disc 40 relative to the driven shaft 25 does cause one of the pawl arms 68 to touch the toothed clutch wall 38 while the high-speed friction clutch is engaged, the inclination of the touching pawl arm relative to the direction of high-speed rotation will cause the pawl arm merely to ride over the clutch teeth 64.

It is apparent that the support disc 40 has a lost-motion connection with the driven shaft 25 and serves, in effect, as means for operatively interconnecting the two clutches to make the low speed clutch operatively responsive to the high-speed clutch. Thus the high-speed clutch comprising the friction clutch shoes 42 on one side of the disc 40 has a limited range of rotation relative to the driven shaft 25 and controls the low-speed clutch by its relative movement within this range.

The coiled spring 60 not only provides the force for frictional engagement of the two clutch shoes 42 with the surrounding clutch wall 36 but also tends to keep the high speed clutch within an intermediate portion of its range of relative rotation to prevent release actuation of the clutch shoes. When the torque load on the driven shaft 25 reaches a magnitude sufficient to overcome the coiled spring 60 the high-speed clutch automatically releases to make the low-speed clutch carry the load. Thus the coiled spring 60 determines the critical point in rising torque values at which the load is shifted from one clutch to another and the strength and scale of the spring 60 may be selected to predetermine the critical torque load as may be desired.

The operation of the invention may be readily understood from the foregoing descriptions. If it is assumed that the drive shaft 22 is rotated counter-clockwise as viewed in Figures 2 and 3 to actuate the driven shaft 25 clockwise under a relatively low torque load, the drive shaft will actuate the driven shaft through the high-speed gearing and the high-speed friction clutch. The driving force will be transmitted from the drive shaft 22 through the high-speed gears 28 and 30 to drive the cylindrical wall 36 of the high-speed clutch and the clutch shoes 42 will be driven by frictional engagement with the cylindrical clutch wall.

The clutch shoulder 46 of the right clutch shoe 42 presses against the flat face 50 of the driven shaft 25 as shown in Figure 3 to transmit the driving force to the shaft. Since the high-speed gear ratio is 4:1, the driven shaft 25 is rotated four times as fast as the drive shaft 22. Since the clutch pawl 65 is carried by the disc 40 along with the friction clutch shoes 42, the pawl 65 travels in its circular path at four times the speed of rotation of the drive shaft 22. The surrounding toothed clutch wall 38 rotates at the same speed as the drive shaft 22, however, since the meshed low-speed gears 32 and 34 are of equal diameters. The clutch pawl 65 is free to travel four times as fast as the surrounding toothed wall 38, even though it may touch the toothed wall because the pawl is positioned with its left arm 68 inclined away from the direction of relative rotation as may be seen in Figure 6.

During this high-speed operation of the driven shaft 25 the reaction force on the right friction clutch shoe 42 created by impingement of the right clutch shoulder 46 against the flat face 50 of the driven shaft 25 tends to cause clock-wise rotation of the right shoe, as viewed in Figure 3, with consequent release rotation of both of the clutch shoes. This reaction is opposed however by the spring 60.

If the load torque rises to a magnitude sufficient to overcome the spring 60, however, the reaction force will cause the two clutch shoes 42 to retract to their released positions shown in Figure 4 and at the same time the slight rotation of the disc 40 involved in this release action will cause the pawl 65 to bring its left arm 68 into effective contact with the surrounding toothed clutch wall 38, as shown in Figure 5. The drive shaft 22 will then drive the driven shaft 25 at the low-speed ratio of 1:1 through the low-speed gearing and the low-speed clutch.

The low-speed driving force is transmitted to the driven shaft 25 through the low-speed gears 32 and 34 and the toothed clutch wall 38 that is integral with gear 34. The pawl 65 engages the toothed clutch wall 38 with its left pawl arm 68 as shown in Figure 5. During this low-speed operation of the driven shaft 25, the high-speed gearing comprising gear 28 and gear 30 causes the high-speed clutch wall 36 to rotate four times as fast as the driven shaft 25 and the retracted clutch shoes 42.

While the low-speed gearing comprising the gears 32 and 34 are actuating the driven shaft 25 through the low-speed clutch with the driving force transmitted through the pawl 65, pawl pivot pin 66, disc 40, clutch shoe pivot pins 44 and clutch shoes 42, the spring 60 exerts a continuous force tending to spread the high-speed clutch shoes 42 apart into frictional engagement with the surrounding clutch wall 36. Whenever the torque load on the driven shaft 25 drops sufficiently to permit the spring 60 to expand, the clutch shoes 42 frictionally engage the surrounding clutch wall 36 to resume high-speed actuation of the driven shaft through the high speed gears 28 and 30. Thus the driving force is imparted to the driven shaft 25 by the shoulders 46 of clutch shoes 42 bearing against one end of the flat face 50 of driven shaft 25, whether a high or low load torque is applied to driven shaft 25, and whether the high speed friction clutch or low speed overriding clutch is engaged. Under a low load torque, clutch shoes drive shaft 25 as shown in Figure 3. Under a heavy load, clutch shoes drive shaft 25 as shown in Figure 4. Operating finger 70 of pawl 62 fits in groove 72 of shaft 25 only to provide a positive means of pivoting pawl 65 about pin 66 whenever direction of rotation of shaft 25 is reversed, instead of depending only on the spring action of split ring 74 to pivot pawl 65. Split ring 74 could be deformed but not pivot pawl 65 in case of high frictional resistance to pivoting of pawl 65 when direction of rotation of shaft 25 is reversed.

It is apparent that with this gear mechanism incorporated into the construction of a fishing reel and with the drive shaft 22 operating by a crank in the usual manner to reel in a fish, the gear mechanism will respond automatically to the tension on the fish line. The gear mechanism will operate at high speed whenever the line slackens and will operate at low speed whenever the fish exerts substantial pull on the line.

A feature of this embodiment of the invention is the manner in which the gear mechanism responds to the tug of a fish while the reel is unattended with the drive shaft 22 free to rotate. The pull of the fish on the line causes a clock-wise torque on the driven shaft 25 and the driven shaft rotates relative to the disc 40 to bring the flat face 50 of the driven shaft against the shoulder 46 of the left clutch shoe 42 instead of the right clutch shoe. The shaft 25 pressing against the left clutch shoe 42 tends to rotate the disc 40 in a clock-wise direction and thus tends to cause the pawl 65 to travel in a clockwise direction. The pawl cannot travel in a clock-wise direction, however, because, as shown in Figure 6, the rotational shift of the shaft 25 to engagement with the shoulder 46 of the left clutch shoe 42 causes the pawl 65 to swing from the position shown in Figure 5 to the opposite position shown in Figure 6. Thus, the frictional engagement of the shoes 42 with the surrounding clutch wall 36 tends to make the pawl travel counterclockwise at four times the speed of the toothed wall 38 surrounding the pawl but the right pawl arm 68 is inclined in the direction for positive engagement with the toothed wall to prevent such rotation.

It is apparent, then, that the gear mechanism will be immobilized to resist unreeling of the fish line so long as the pull by the fish is insufficient to overcome the resistance of the spring 60. If, however, the pull by the fish places the line under such tension as to overcome the spring 60, the clutch shoe 42 will release and permit the shaft 25 to rotate the toothed clutch wall 38 by means of the pawl member 65 so that the line will be unreeled with the shaft 25 rotating the shaft 22 through the low-speed gearing. Whenever the tug of the fish relaxes sufficiently to permit the spring 60 to expand, the gear mechanism is again immobilized.

In some instances it may be desirable to permit the fish line to unwind freely when the reel is unattended, instead of having the gear mechanism frictionally immobilized. To achieve this mode of operation, it is merely necessary to add a leaf spring to tend in a yielding manner to centralize the flat face 50 of the driven shaft relative to the two shoulders 46 of the two cooperating clutch shoes 42. For this purpose, Figures 9 and 10 show a modification of the invention which is similar to the structure heretofore described, as indicated by the use of corresponding numerals to indicate corresponding parts.

In Figures 9 and 10, the two clutch shoes 42a are cut away to form an enlarged non-circular opening 45a to accommodate a leaf spring 80. The leaf-spring 80 lies against the flat face 50 of the driven shaft 25 and the two ends of the leaf-spring bear against the two clutch shoes 42a in a yielding manner to tend to centralize the flat face of the shaft relative to the pair of clutch shoes. This centralizing action tends to maintain the pawl 25 in a neutral position such as shown in Figure 7.

This modification of the invention will operate in the same manner as heretofore described when the driven shaft 25 is being actuated by the drive shaft 22. Thus when the torque load rises to a magnitude sufficient to overcome the leaf-spring 80 together with the coiled spring 60 the clutch shoes 42a will be retracted in the manner indicated in Figure 9 to cause the gear mechanism to shift from high-speed operation to low-speed operation.

If a fish pulls on the line while the reel is unattended, the friction clutch shoes 42a will be in their effective positions as shown in Figure 8 to drive the shaft 22 through the high-speed gears 28 and 30 and the low-speed clutch will not interfere because the pawl 65 will be in a neutral position such as shown in Figure 7.

Figure 10 shows a modification of the low speed clutch that may be used if desired. In this form of the invention, the low-speed clutch wall 38a formed in the low-speed gear 34 is smooth instead of toothed and the pawl member 65 is replaced by a frictional detent member 65a. The frictional detent member 65a has two friction arms 68a of the configuration shown, each of which engages the surrounding wall 38a in a manner permitting relative rotation in one direction but opposing relative rotation in the other direction. Thus each of the friction arms 68a is functionally equivalent to the corresponding arm 68 of the previously described pawl 65. The rest of the structure shown in Figure 10 is identical with previously described structure as indicated by the use of corresponding numerals to indicate corresponding parts. It will be apparent that the modification shown in Figure 10 results in the same mode of operation as heretofore described.

Although the now preferred embodiments of the present invention have been shown and described herein, it is to be understood that the invention is not to be limited thereto, for it is susceptible to changes in form and detail within the scope of the appended claims.

I claim:

1. In a gear mechanism of the character described, the combination of: rotary input means; high-speed gearing operatively connected with said input means; low-speed gearing operatively connected with said input means; a first clutch means for operatively connecting said high-speed gearing with said output means, said first clutch means having freedom for a limited range of rotary movement relative to said output means, said clutch means having release positions at the opposite limits respectively of said range to free the output means from said high-speed gearing, said first clutch means having an intermediate position for operatively connecting the high-speed gearing with the output means; and yielding means to resist movement of said first clutch means from its intermediate position to either of said limit positions thereby to prevent release of the output means from the high-speed gearing when the torque resistance of the output means is below a predetermined magnitude; and a second clutch means for operatively connecting said low-speed gearing with said output means, said second clutch means being an overriding clutch to permit said output means to race ahead of the low-speed gearing when the first clutch is effective.

2. A combination as set forth in claim 1 in which said second clutch means is operatively connected with said first clutch means to reverse its direction of override in response to movement of said first clutch means from either of its two limit positions to the other limit position.

3. In a gear mechanism of the character described, the combination of: a rotary input means; a rotary output means; high-speed gearing operatively connected with said input means for actuation thereby; low-speed gearing operatively connected with said input means for actuation thereby; support means operatively connected to said output means for movement therewith with freedom for a limited range of movement relative thereto between two limit positions; yielding means between said support means and said output means to urge said support means to an intermediate position in said range between said two limit positions; a first clutch for operatively connecting said high-speed gearing with said output means, said first clutch being releasable in response to movement of said support means from its intermediate position to either limit of said range in opposition to said yielding means; and a second reversible overriding clutch for operatively connecting said low-speed gearing with said output means, said second clutch being reversible in response to movement in said support means from either limit of said range to the other limit.

4. A combination as set forth in claim 3 in which each of said clutches includes a clutch member pivotally mounted on said support means.

5. A combination as set forth in claim 4 in which said support means is mounted on said output means and said clutch members of the two clutches are mounted respectively on opposite sides of the support means.

6. A combination as set forth in claim 3 in which said overriding clutch has an intermediate release position to free said output means from said low-speed gearing and is movable to said intermediate position in response to movement of said support to its intermediate position.

7. A combination as set forth in claim 6 in which said first clutch includes a friction clutch shoe pivotally mounted on said support means and said second clutch includes a detent member pivotally mounted on said support means.

8. A combination as set forth in claim 3 in which said support means has a smaller intermediate range of relative rotation in said first mentioned range independent of said yielding means with the first clutch released and in which said second clutch is effective at each end of said intermediate range whereby the two clutches will cooperate to yieldingly immobilize said driven shaft when a load is applied to the driven shaft instead of applied to the drive shaft.

9. A two speed transmission gear mechanism including in combination: first and second rotatable shafts positioned in spaced parallel relation; high-speed gearing including a first gear affixed to said first shaft and further including a second gear rotatably mounted on said second shaft and meshing with said first gear; low-speed gearing including a third gear affixed to said first shaft spaced axially from said first gear and further including a fourth gear rotatably mounted on said second shaft spaced axially from said second gear and meshing with said third gear; a support member rotatably mounted on said second shaft interposed between said second gear and said fourth gear; a first clutch including shoe means pivotally mounted on said support member and actuated from an engaged position with said second gear at a disengaged position upon the relative rotation between said second shaft and said support member and said first clutch further including yieldable means for biasing said shoe means into said engaged position; and a second clutch for operatively connecting said fourth gear to said second gear upon such relative rotation between said second shaft and said support member, said second clutch including overriding means to permit said support member to race ahead of said fourth gear when said shoe means of said first clutch is in said engaged position.

10. The combination as set forth in claim 9 in which said shoe means includes a pair of friction shoes pivotally mounted on one side of said support member and defining an opening having a flattened edge and through which said second shaft extends, said second shaft having a flat face coacting with said flattened edge to pivot one or the other of said shoes against the bias of said yieldable means upon relative rotation between said support member and said second shaft in either direction, thereby to disengage said shoe means from said second gear in response to a rise in load torque on said second shaft in either rotary direction.

11. The combination set forth in claim 10 in which said second clutch includes a member having a circular series of teeth and coupled to said first gear, and which second clutch further includes a pawl member pivotally coupled to said support member, said pawl member having first and second angular arms and being actuated between first and second limit positions upon said relative rotation between said second shaft and said support member, said first angular arm of said pawl engaging said teeth in said first limit position and said second angular arm of said pawl engaging said teeth in said second limit position.

12. In a gear mechanism of the character described, the combination of: rotary input means; rotary output means; high-speed gearing operatively connected with said input means; low-speed gearing operatively connected with said input means; a first high-speed clutch operatively connecting said high-speed gearing with said output means, said clutch being releasable in response to a rise in load to a predetermined magnitude; and a second low-speed clutch operatively connecting said low-speed gearing to said output means, said low-speed clutch including a circular series of clutch teeth and a pawl member having two arms, said pawl member being reversible between two limit positions with one of said pawl arms in engagement with said teeth at one of the limit positions and the other pawl arm in engagement with the teeth at the other limit position, said second clutch being an overriding clutch to permit said output means to race ahead of the low-speed gearing when said first clutch is effective.

13. In a gear mechanism of the character described, the combination of: rotary input means; rotary output means; high-speed gearing operatively connected with said input means; low-speed gearing operatively connected with said input means; a first high-speed clutch operatively connecting said high-speed gearing with said output means, said clutch being releasable in response to a rise in load to a predetermined magnitude; and a second low-speed clutch operatively connecting said low-speed gearing with said output means, said second clutch being an overriding clutch to permit said output means to race ahead of the low-speed gearing when said first clutch is effective, said two clutches having cylindrical casings respectively mounted on said input means, said casings having open ends adjoining each other, and the mechanisms of said two clutches being interconnected through the open ends of said two casings.

References Cited in the file of this patent

UNITED STATES PATENTS 2,232,477     Rueb _____ Feb. 18, 1941

FOREIGN PATENTS 534,667     France _____ Jan. 10, 1922